US010411915B2

(12) United States Patent
Yamazaki

(10) Patent No.: US 10,411,915 B2
(45) Date of Patent: Sep. 10, 2019

(54) WIRELESS COMMUNICATION APPARATUS, METHOD, AND RECORDING MEDIUM

(71) Applicant: NEC Corporation, Minato-ku, Tokyo (JP)

(72) Inventor: Kenichiro Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/909,197

(22) Filed: Mar. 1, 2018

(65) Prior Publication Data

US 2018/0270087 A1 Sep. 20, 2018

(30) Foreign Application Priority Data

Mar. 15, 2017 (JP) ................. 2017-050199

(51) Int. Cl.
*H03D 1/00* (2006.01)
*H04L 25/02* (2006.01)

(52) U.S. Cl.
CPC .......... *H04L 25/025* (2013.01); *H04L 25/021* (2013.01); *H04L 25/0206* (2013.01); *H04L 25/0208* (2013.01); *H04L 25/0224* (2013.01); *H04L 25/0252* (2013.01)

(58) Field of Classification Search
CPC .............. H04L 25/025; H04L 25/0252; H04L 25/0206; H04L 25/0208
See application file for complete search history.

(56) References Cited

U.S. PATENT DOCUMENTS

2014/0003476 A1\* 1/2014 Xu ...................... H04L 25/0224
375/224
2018/0139712 A1\* 5/2018 Abedini .............. H04L 27/2657

FOREIGN PATENT DOCUMENTS

JP 2002-305471 A 10/2002
JP 2007-166194 A 6/2007

\* cited by examiner

*Primary Examiner* — Dhaval V Patel

(57) ABSTRACT

To enable use of channel related information more suitable for propagation environment. A wireless communication apparatus according to an example aspect of the present invention includes: a memory storing instructions; and one or more processors configured to execute the instructions to: acquire correlation information regarding correlation between first channel related information generated through channel estimation for a first estimation period and second channel related information generated through channel estimation for one or more estimation periods before the first estimation period; and perform control for a statistic of channel related information, based on the correlation information.

19 Claims, 5 Drawing Sheets

400

WIRELESS COMMUNICATION APPARATUS, METHOD, AND RECORDING MEDIUM

BACKGROUND

Technical Field

The present invention relates to a wireless communication apparatus, a method, and a recording medium.

This application is based upon and claims the benefit of priority from Japanese Patent application No. 2017-50199, filed on Mar. 15, 2017, the disclosure of which is incorporated herein in its entirety by reference.

Background Art

A reception apparatus in a wireless communication system performs channel estimation and performs processing on a received signal by using a result of the channel estimation (channel estimation value). Whether or not the received signal is demodulated correctly, highly depends on the accuracy of the channel estimation. In view of this, for example, time averaging is performed on channel estimation values to increase the accuracy of channel estimation by improving received signal-to-noise ratio (SNR).

For example, there is a technique for performing simple moving averaging on a current channel estimation value and a past channel estimation value. However, in this technique, the difference between the mean value of channel estimation values and an actual channel variation value is large when propagation environment changes fast, which results in a decrease in accuracy of channel estimation. For example, such a decrease in accuracy of channel estimation may occur when a transmission apparatus and/or a reception apparatus moves at a high speed.

As another technique, Patent Literature 1 (PTL1) describes a technique for performing weighted moving averaging on a current channel estimation value and a past channel estimation value. As still another technique, Patent Literature 2 (PTL2) describes a technique using the mean value of channel estimation values when signal-to-interference ratio (SIR) or signal-to-interference-plus-noise ratio (SINR) is large.

[PTL 1] Japanese Laid-open Patent Publication No. 2007-166194

[PTL 2] Japanese Laid-open Patent Publication No. 2002-305471

SUMMARY

An example object of the present invention is to provide a wireless communication apparatus, a method, and a program that enable use of channel related information more suitable for propagation environment.

A wireless communication apparatus according to an example aspect of the present invention includes: a memory storing instructions; and one or more processors configured to execute the instructions to: acquire correlation information regarding correlation between first channel related information generated through channel estimation for a first estimation period and second channel related information generated through channel estimation for one or more estimation periods before the first estimation period; and perform control for a statistic of channel related information, based on the correlation information.

A method according to an example aspect of the present invention includes: acquiring correlation information regarding correlation between first channel related information generated through channel estimation for a first estimation period and second channel related information generated through channel estimation for one or more estimation periods before the first estimation period; and performing control for a statistic of channel related information, based on the correlation information.

A non-transitory computer readable recording medium according to an example aspect of the present invention is a non-transitory computer readable recording medium recording a program for causing a processor to execute: acquiring correlation information regarding correlation between first channel related information generated through channel estimation for a first estimation period and second channel related information generated through channel estimation for one or more estimation periods before the first estimation period; and performing control for a statistic of channel related information, based on the correlation information.

According to the present invention, for example, channel related information more suitable for propagation environment can be used. Note that the present invention may exert other advantages instead of the above example advantage or together with the above example advantage.

DESCRIPTION OF THE EMBODIMENTS

Exemplary embodiments of the present invention will be described below in detail with reference to the accompanying drawings. Note that, in the present description and drawings, elements to which the same or similar descriptions are applicable are denoted by the same reference signs, whereby overlapping descriptions may be omitted.

Descriptions will be given in the following order.
1. Overview of Exemplary Embodiments
2. First Exemplary Embodiment
2.1. Configuration of System
2.2. Configuration of Reception Apparatus 2.3. Flow of Processing
2.4. Modified Examples
3. Second Exemplary Embodiment
3.1. Configuration of Wireless Communication Apparatus
3.2. Flow of Processing

1. Overview of Exemplary Embodiments

First, an overview of exemplary embodiments of the present invention are described.

In the exemplary embodiments of the present invention, the wireless communication apparatus performs control for a statistic (e.g., mean value) of channel related information on the basis of correlation information regarding correlation between first channel related information and second channel related information. The first channel related information is channel related information (e.g., newest channel related information) generated through channel estimation for a first estimation period. Moreover, the second channel related information is channel related information (e.g., past channel related information) generated through channel estimation for one or more estimation periods before the first estimation period.

For example, the control for the statistic is determination whether to use the statistic. Alternatively, the control may be determination of a parameter to be used for calculation of the statistic.

This, for example, enables use of channel related information more suitable for propagation environment.

2. First Exemplary Embodiment

Next, with reference to FIG. 1 to FIG. 6, a first exemplary embodiment is described.

2.1. Configuration of System

Figure 1:
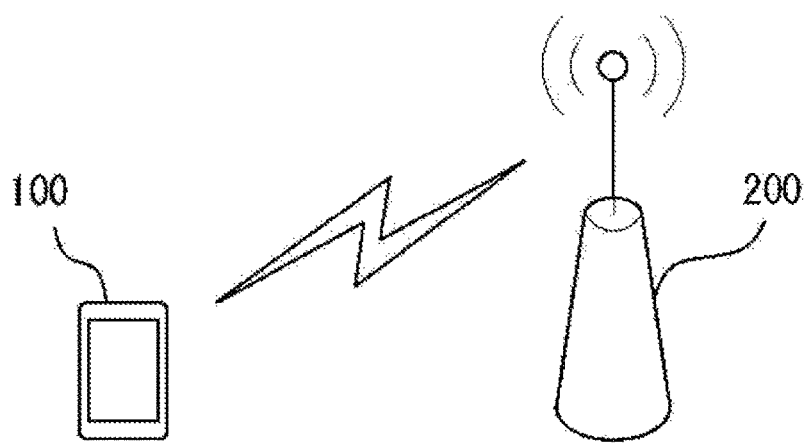
FIG. 1 is an explanatory diagram illustrating an example of a schematic configuration of a system according to a first exemplary embodiment.

First, with reference to FIG. 1, an example of a configuration of a system 1 according to the first exemplary embodiment is described. FIG. 1 is an explanatory diagram illustrating an example of a schematic configuration of the system 1 according to the first exemplary embodiment. According to FIG. 1, the system 1 includes a reception apparatus 100 and a transmission apparatus 200. The reception apparatus 100 and the transmission apparatus 200 can be considered as wireless communication apparatuses.

The transmission apparatus 200 transmits a signal wirelessly, and the reception apparatus 100 receives the signal. In the first exemplary embodiment, the reception apparatus 100 performs channel estimation for a channel from the transmission apparatus 200 to the reception apparatus 100 on the basis of the received signal.

For example, the reception apparatus 100 is a terminal apparatus (or may be referred to as a user equipment (UE), a user terminal, a mobile station, or the like), and the transmission apparatus 200 is a base station. In this case, the reception apparatus 100 performs downlink channel estimation.

Note that the reception apparatus 100 may, of course, perform transmission as well as reception, and the transmission apparatus 200 may perform reception as well as transmission. For example, the reception apparatus 100 may transmit a signal wirelessly, and the transmission apparatus 200 may receive the signal. The reception apparatus 100 and the transmission apparatus 200 can be considered as wireless communication apparatuses but are referred to as a reception apparatus and a transmission apparatus to facilitate the understanding of the first exemplary embodiment.

For example, the system 1 is a system conforming to standards of the Third Generation Partnership Project (3GPP). More specifically, the system 1 may be a system conforming to the LTE/LTE-Advanced and/or the system architecture evolution (SAE). Alternatively, the system 1 may be a system conforming to 5th generation (5G) standards. The system 1 is, of course, not limited to these examples.

2.2. Configuration of Reception Apparatus

Figure 2:
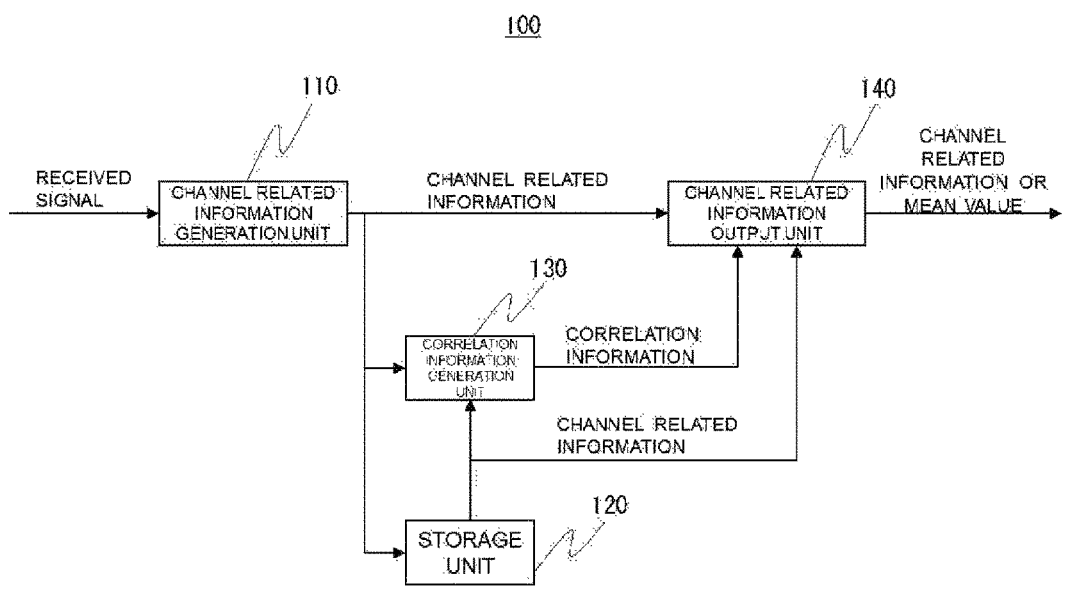
FIG. 2 is a block diagram illustrating an example of a schematic configuration of a reception apparatus according to the first exemplary embodiment.
Figure 3:
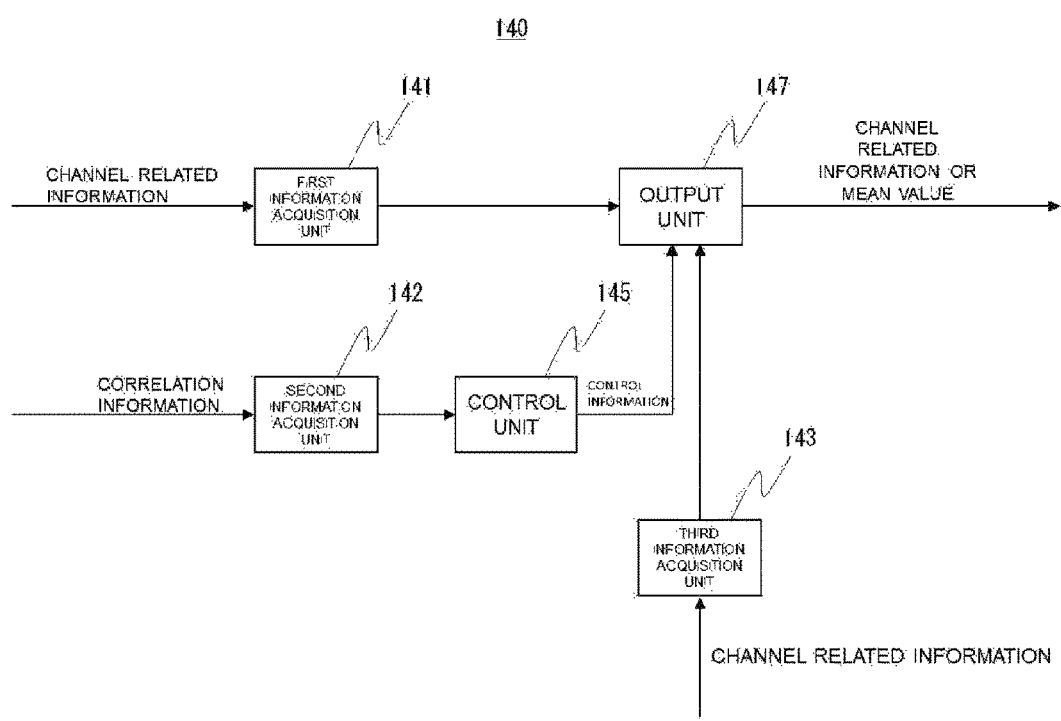
FIG. 3 is a block diagram illustrating an example of a schematic configuration of a channel related information output unit according to the first exemplary embodiment.

Next, with reference to FIG. 2 and FIG. 3, an example of a configuration of the reception apparatus 100 according to the first exemplary embodiment is described.

FIG. 2 is a block diagram illustrating an example of a schematic configuration of the reception apparatus 100 according to the first exemplary embodiment. According to FIG. 2, the reception apparatus 100 includes a channel related information generation unit 110, a storage unit 120, a correlation information generation unit 130, and a channel related information output unit 140.

FIG. 3 is a block diagram illustrating an example of a schematic configuration of the channel related information output unit 140 according to the first exemplary embodiment. According to FIG. 3, the channel related information output unit 140 includes a first information acquisition unit 141, a second information acquisition unit 142, a third information acquisition unit 143, a control unit 145, and an output unit 147.

The channel related information generation unit 110, the correlation information generation unit 130, and the channel related information output unit 140 may be implemented by one or more processors, such as a baseband (BB) processor and/or a processor of another kind, and a memory storing programs (instructions). Moreover, the storage unit 120 may be implemented by a memory. Note that each memory described above may be located outside the one or more processors or may be included in the one or more processors.

The reception apparatus 100 may include a memory storing programs (instructions) and one or more processors that can execute the programs (instructions). The one or more processors may perform, by executing the programs, operations of the channel related information generation unit 110, the correlation information generation unit 130 and/or the channel related information output unit 140 (the first information acquisition unit 141, the second information acquisition unit 142, the third information acquisition unit 143, the control unit 145, and/or the output unit 147). The programs may be programs for causing one or more processors to perform the operations of the channel related information generation unit 110, the correlation information generation unit 130 and/or the channel related information output unit 140 (the first information acquisition unit 141, the second information acquisition unit 142, the third information acquisition unit 143, the control unit 145, and/or the output unit 147).

Note that the reception apparatus 100 may, of course, include constituent elements other than the channel related information generation unit 110, the storage unit 120, the correlation information generation unit 130, and the channel related information output unit 140.

(1) Channel Related Information Generation Unit 110

The channel related information generation unit 110 generates channel related information through channel estimation for an estimation period.

Estimation Period

For example, the estimation period is preconfigured for the reception apparatus 100. Alternatively, the estimation period may be predefined.

For example, the estimation period occurs cyclically, and the channel related information generation unit 110 performs channel estimation for each estimation period to generate channel related information for each estimation period.

For example, the estimation period corresponds to one or more symbols, one or more slots, one or more subframes, or one or more radio frames. Note that the estimation period is not limited to these examples.

Channel Estimation

The channel estimation is channel estimation for the channel from the transmission apparatus 200 to the reception apparatus 100.

For example, as described above, the reception apparatus 100 is a terminal apparatus, and the transmission apparatus 200 is a base station. In this case, the channel estimation is channel estimation for a channel from the base station (transmission apparatus 200) to the terminal apparatus (reception apparatus 100). In other words, the channel estimation is downlink channel estimation.

For example, the transmission apparatus 200 transmits a signal (e.g., a reference signal (RS)) in the estimation period. The reception apparatus 100 (channel related information generation unit 110) then performs channel estimation for the channel from the transmission apparatus 200 to the reception apparatus 100 on the basis of a signal received in the estimation period and a prestored reference signal. The reception apparatus 100 calculates (generates) a channel estimation value for the channel by performing the channel estimation. Note that the received signal may include an interference signal and noise in addition to the signal transmitted from the transmission apparatus 200.

Channel Related Information

Channel Estimation Value

The channel related information is, for example, a channel estimation value. In other words, the channel related information generation unit 110 generates a channel estimation value through channel estimation for an estimation period.

For example, the transmission apparatus 200 transmits signals through multiple transmit antennas, and/or the reception apparatus 100 receives the signals through multiple receive antennas. In this case, the channel related information is, for example, individual elements (channel estimation values) included in a channel matrix or a channel vector having the elements the number of which corresponds to the number of transmit antennas*the number of receive antennas. In this case, for example, generation of correlation information to be described later and generation of a statistic to be described later are performed for each of such elements.

Alternatively, the channel related information may be the channel matrix or the channel vector (set of channel estimation values). In this case as in the above case, generation of correlation information to be described later and generation of a statistic to be described later may be performed for each of the elements included in the channel matrix or the channel vector.

Unit of Generation (Time)

For example, the channel related information generation unit 110 generates channel related information for each estimation period.

Unit of Generation (Frequency)

For example, the channel related information generation unit 110 performs channel estimation and generates channel related information, for each frequency block. In other words, the channel related information is information for each frequency block. The frequency block may be preconfigured or predefined for the reception apparatus 100. As an example, the frequency block includes one or more resource blocks in the frequency direction.

Output

For example, the channel related information generation unit 110 generates and outputs channel related information. The channel related information is then input to the storage unit 120, the correlation information generation unit 130, and the channel related information output unit 140.

(2) Storage Unit 120

The Storage Unit 120 Stores Channel Related Information.

For example, the storage unit 120 stores channel related information generated by the channel related information generation unit 110. For example, the storage unit 120 stores channel related information generated through channel estimation for each estimation period (i.e., channel related information for each estimation period). For example, the channel related information for each estimation period is stored until a predetermined period has elapsed from the start of storing of the channel related information, and is deleted after the elapse of the predetermined period.

For example, the storage unit 120 outputs stored channel related information, and the channel related information is input to the correlation information generation unit 130 and/or the channel related information output unit 140.

(3) Correlation Information Generation Unit 130

The correlation information generation unit 130 generates correlation information regarding correlation between the first channel related information and the second channel related information.

First Channel Related Information

The first channel related information is channel related information generated through channel estimation for a first estimation period (i.e., channel related information for the first estimation period).

For example, the first estimation period is the n-th estimation period, and the first channel related information is channel related information for the n-th estimation period. For example, the first channel related information is a channel estimation value for the n-th estimation period and is represented by $h(n)$.

For example, the first estimation period (n-th estimation period) is the newest (most recent) estimation period, and the first channel related information is output from the channel related information generation unit 110 and input to the correlation information generation unit 130. In other words, the first channel related information is the newest channel related information.

Second Channel Related Information

The second channel related information is channel related information generated through channel estimation for one or more estimation periods before the first estimation period.

For example, the second channel related information is channel related information generated through channel estimation for a second estimation period immediately before the first estimation period (i.e., channel related information for the second estimation period).

For example, the second estimation period is the n−1-th estimation period, and the second channel related information is channel related information for the n−1-th estimation period. For example, the second channel related information is a channel estimation value for the n−1-th estimation period and is represented by $h(n-1)$.

For example, the second estimation period (n−1-th estimation period) is the estimation period immediately before the newest (most recent) estimation period, and the second channel related information is stored in the storage unit 120 and input to the correlation information generation unit 130. In other words, the second channel related information is past channel related information.

Correlation Information

For example, the correlation information is information indicating the degree of correlation between the first channel related information and the second channel related information. Specifically, for example, the correlation information is a correlation value indicating the degree of correlation. For example, the higher the degree of correlation is, the larger the correlation value becomes; the lower the degree of correlation is, the smaller the correlation value becomes.

For example, when the first channel related information (first channel estimation value) is represented by h(n) and the second channel related information (second channel estimation value) is represented by h(n−1) as described above, the correlation value is, for example, represented by X(n) and calculated as follows.

$$X(n) = \frac{h(n) \times \overline{h(n-1)}}{|h(n)||h(n-1)|} \qquad \text{[Math. 1]}$$

Here, the following term represents complex conjugate of h(n−1) (this applies also to mathematical expressions to be given below).

$$\overline{h(n-1)} \qquad \text{[Math. 2]}$$

For example, the correlation value is a true value. As an example, the correlation value may be a value of 0.1 to 1. Alternatively, the correlation value may be a decibel value. In this case, the correlation value may be a value of −10 dB to 0 dB.

Output

For example, the correlation information generation unit 130 outputs the correlation information, and the correlation information is input to the channel related information output unit 140.

(4) Channel Related Information Output Unit 140

The channel related information output unit 140 outputs channel related information (statistic or information itself) to be used.

(4-1) First Information Acquisition Unit 141

The first information acquisition unit 141 acquires channel related information generated through channel estimation for the first estimation period (which may be referred to simply as "channel related information for the first estimation period" below). The channel related information (e.g., the channel estimation value h(n)) is output from the channel related information generation unit 110. Simply stated, for example, the first information acquisition unit 141 acquires the newest channel related information.

(4-2) Second Information Acquisition Unit 142

The second information acquisition unit 142 acquires the correlation information.

(4-3) Third Information Acquisition Unit 143

The third information acquisition unit 143, for example, acquires channel related information generated through channel estimation for the second estimation period (which may be referred to simply as "channel related information for the second estimation period" below). The channel related information (e.g., the channel estimation value h(n−1)) is output from the storage unit 120. Simply stated, for example, the third information acquisition unit 143 acquires past channel related information.

(4-4) Control Unit 145

The control unit 145 performs control for a statistic of channel related information on the basis of the correlation information.

Statistic

Mean Value

For example, the statistic is a mean value of the channel related information.

Specifically, for example, the mean value is the mean value of the channel related information for the first estimation period (e.g., the channel estimation value h(n)) and channel related information for the second estimation period immediately before the first estimation period (e.g., the channel estimation value h(n−1)). Simply stated, for example, the mean value is the mean value of the newest channel related information and past channel related information. As an example, the mean value is a simple mean value and is represented by H(n) as that given below.

$$H(n) = \frac{h(n) + h(n-1)}{2} \qquad \text{[Math. 3]}$$

Use

For example, the statistic is information for reception processing by the reception apparatus 100. Alternatively/moreover, the statistic may be information for reporting from the reception apparatus 100 to the transmission apparatus 200.

Control

For example, the control is determination whether to use the statistic. In other words, the control unit 145 determines whether to use the statistic (e.g., for reception processing by the reception apparatus 100 or reporting to the transmission apparatus 200) on the basis of the correlation information.

More specifically, for example, the control is determination whether to use the statistic or to use the channel related information for the first estimation period. Specifically, the control unit 145 determines whether to use the statistic (e.g., for reception processing by the reception apparatus 100 or reporting to the transmission apparatus 200) or to use the channel related information for the first estimation period (i.e., information itself, which is not the statistic) on the basis of the correlation information.

More specifically, for example, the control unit 145 determines to use the statistic when the degree of correlation is higher than predetermined degree of correlation, and determines to use the channel related information for the first estimation period when the degree of correlation is lower than the predetermined degree of correlation.

As an example, the control unit 145 determines to use the mean value H(n) of channel estimation values when the correlation value X(n) is larger than a threshold, and determines to use channel estimation value h(n) itself when the correlation value X(n) is smaller than the threshold. As an example, the correlation value X(n) may be a true value of 0.1 to 1, and the threshold may be a value within the range from 0.1 to 1 (e.g., 0.5). Alternatively, the correlation value X(n) may be a decibel value. In this case, the correlation value may be a decibel value of −10 dB to 0 dB, and the threshold may be a value within a range from −10 dB to 0 dB.

Note that, when the degree of correlation is equal to the predetermined degree of correlation, the control unit 145, for example, determines to use the statistic (e.g., H(n)). Alternatively, when the degree of correlation is equal to the predetermined degree of correlation, the control unit 145 may determine to use the channel related information for the first estimation period (e.g., h(n)).

Output

For example, the control unit 145 outputs control information indicating a result of the control, and the control information is input to the output unit 147.

As described above, for example, the control is determination whether to use the statistic, and the control information indicates a result of the determination.

As an example, the control information is 1-bit information (0 or 1). In this case, for example, when the control information is 1, this indicates to use the statistic (e.g., H(n)). Moreover, when the control information is 0, this indicates to use the channel related information for the first estimation period (i.e., information itself, which is not a statistic) (e.g., h(n)). In other words, when the control information is 0, this indicates not to use the statistic.

(4-5) Output Unit 147

The output unit 147 outputs channel related information (statistic or channel related information itself) to be used, on the basis of the control information.

For example, the channel related information to be used is channel related information to be used for reception processing by the reception apparatus 100 or reporting to the transmission apparatus 200.

For example, when the control information indicates to use the statistic (control information=1), the output unit 147 calculates and outputs the statistic. The output unit 147 calculates the statistic (e.g., H(n)) on the basis of the channel related information acquired by the first information acquisition unit 141 (e.g., channel estimation value h(n)) and the channel related information acquired by the third information acquisition unit 143 (e.g., channel estimation value h(n−1)). An example of a method of calculating the statistic is as described above.

For example, when the control information indicates to use the channel related information for the first estimation period (i.e., information itself, which is not a statistic) (control information=0), the output unit 147 outputs the channel related information (e.g., channel estimation value h(n)).

2.3. Flow of Processing

Figure 4:
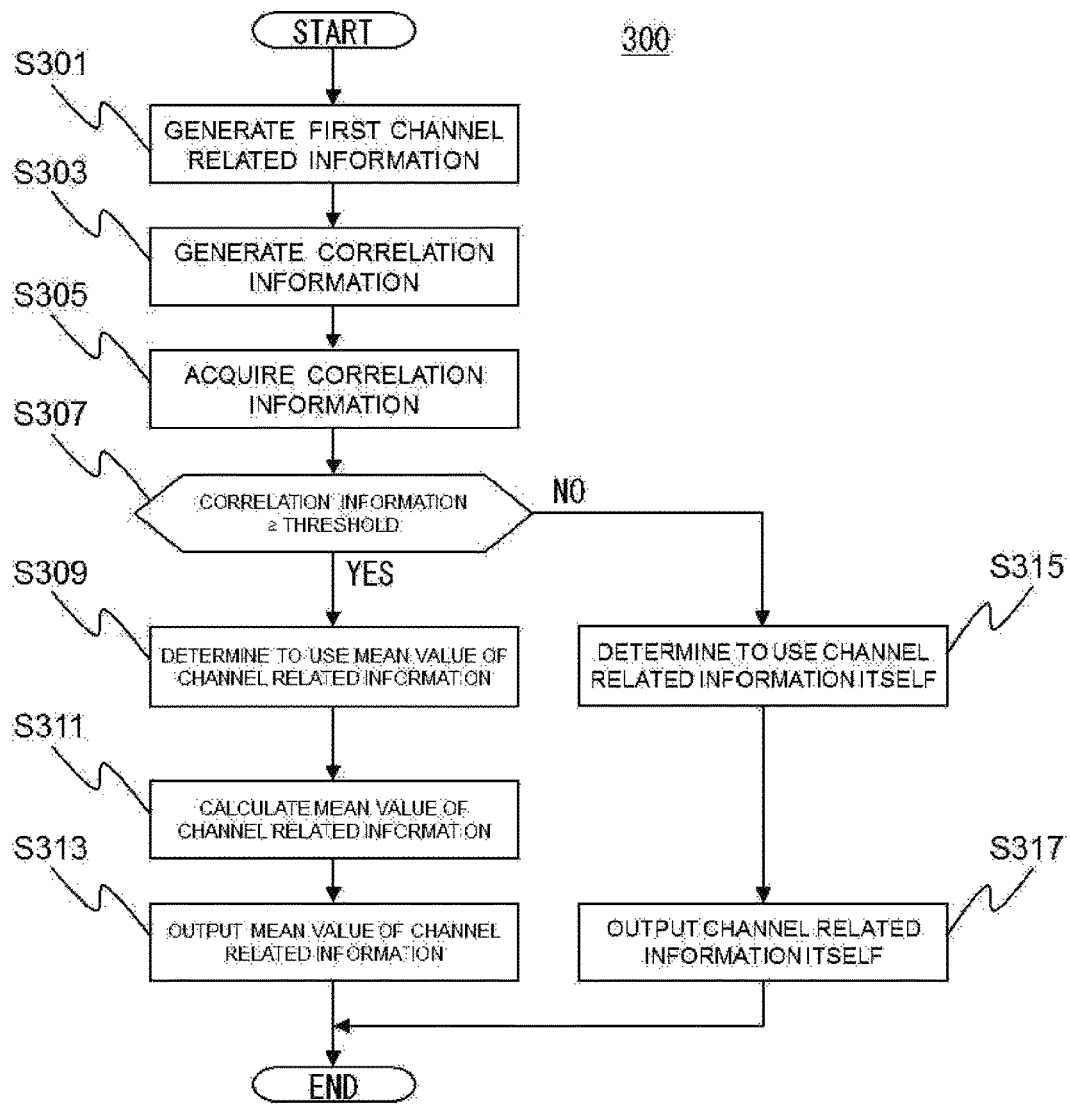
FIG. 4 is a flowchart for describing an example of a schematic flow of processing of the reception apparatus according to the first exemplary embodiment.

Next, with reference to FIG. 4, an example of processing of the reception apparatus 100 according to the first exemplary embodiment is described. FIG. 4 is a flowchart for describing an example of a schematic flow of the processing of the reception apparatus 100 according to the first exemplary embodiment.

The channel related information generation unit 110 generates first channel related information through channel estimation for a first estimation period (S301).

The correlation information generation unit 130 generates correlation information regarding correlation between the first channel related information and second channel related information (S303). For example, the second channel related information is channel related information generated through channel estimation for a second estimation period immediately before the first estimation period.

The second information acquisition unit 142 acquires the correlation information (S305).

For example, the correlation information is a correlation value indicating the degree of correlation between the first channel related information and the second channel related information.

When the correlation value is equal to or larger than a threshold (S307: YES), the control unit 145 determines to use the mean value of channel related information (S309). The output unit 147 calculates the mean value of the channel related information for the first estimation period and the channel related information for the second estimation period (S311) and outputs the mean value (S313). Thereafter, the processing is terminated.

When the correlation value is smaller than the threshold (S307: NO), the control unit 145 determines to use the channel related information for the first estimation period (i.e., the channel related information itself) (S315). The output unit 147 outputs the channel related information for the first estimation period (i.e., the channel related information itself) (S317). Thereafter, the processing is terminated.

2.4. Modified Examples

Figure 5:
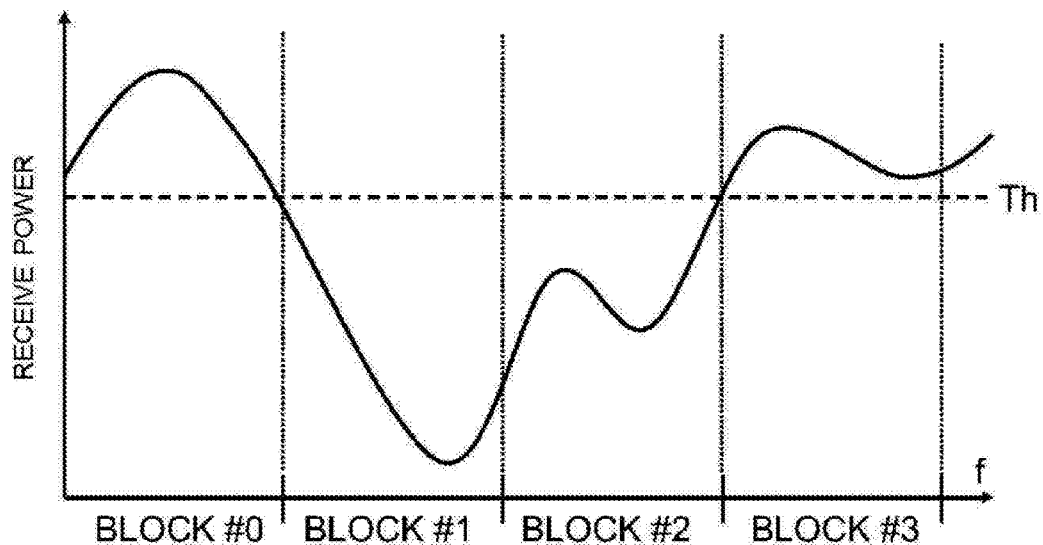
FIG. 5 is an explanatory diagram for describing an example of channel estimation for channel related information to be used for generation of correlation information in a second modified example of the first exemplary embodiment.
Figure 6:
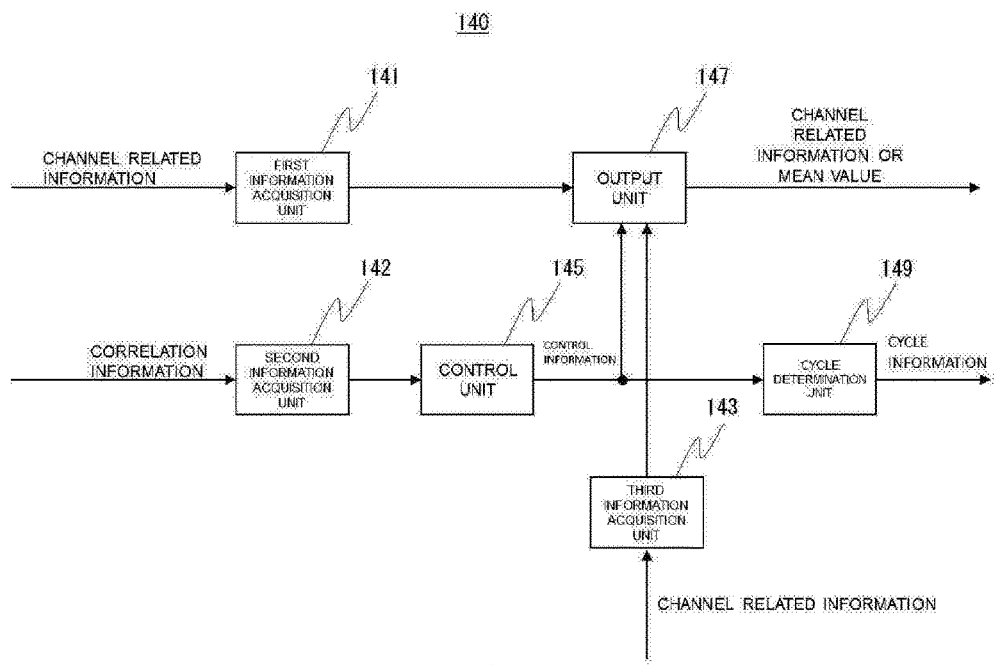
FIG. 6 is a block diagram illustrating an example of a schematic configuration of a channel related information output unit according to a fifth modified example of the first exemplary embodiment.

Next, with reference to FIG. 5 and FIG. 6, various modified examples of the first exemplary embodiment are described.

(1) First Modified Example

Second Channel Related Information

As described above, the correlation information is information regarding correlation between the first channel related information and the second channel related information. In addition, the first channel related information is channel related information generated through channel estimation for the first estimation period, and second channel related information is channel related information generated through channel estimation for one or more estimation periods before the first estimation period.

Moreover, as described above, for example, the second channel related information is channel related information generated through channel estimation for the second estimation period immediately before the first estimation period. However, the first exemplary embodiment is not limited to this example.

In a first modified example of the first exemplary embodiment, for example, the second channel related information may be a statistic of channel related information generated through channel estimation for multiple estimation periods before the first estimation period. Simply stated, for example, the second channel related information may be a statistic of past channel related information (past statistic).

For example, the first estimation period is the n-th estimation period, the multiple estimation periods are estimation periods among the n−1-th and earlier estimation periods, and the second channel related information is a statistic of channel related information for the estimation periods among the n−1-th and earlier estimation periods. More specifically, for example, the second channel related information is the mean value H(n−1) of the channel estimation value for the estimation periods among the n−1-th and earlier estimation periods.

Correlation Information

In the first modified example, the correlation value X(n) is calculated as follows.

$$X(n) = \frac{h(n) \times \overline{H(n-1)}}{|h(n)||H(n-1)|} \quad \text{[Math. 4]}$$

Statistic

As described above, the control unit 145 performs control for a statistic of channel related information on the basis of the correlation information. Moreover, as described above, for example, the statistic is the mean value of channel related information.

As described above, for example, the mean value is the mean value of the channel related information for the first estimation period (e.g., the channel estimation value h(n)) and the channel related information for the second estimation period immediately before the first estimation period (e.g., the channel estimation value h(n−1)). Simply stated, for example, the mean value is the mean value of the newest channel related information and past channel related information. However, the first exemplary embodiment is not limited to this example.

In the first modified example of the first exemplary embodiment, for example, the mean value may be mean value of the channel related information for the first estimation period (e.g., the channel estimation value h(n)) and the earlier mean value of the channel related information generated through channel estimation for multiple estimation periods before the first estimation period (e.g., the mean value H(n−1) of channel estimation value). Simply stated, for example, the mean value is the mean value of the newest channel related information and the mean value of the past channel related information. As an example, the mean value is represented by following H(n).

$$H(n) = \frac{h(n) + H(n-1)}{2}$$ [Math. 5]

(2) Second Modified Example

As described above, for example, the channel related information generation unit 110 performs channel estimation for each frequency block and generates channel related information. In other words, channel related information for each frequency block is generated.

For this reason, in the above-described example, the first channel related information and the second channel related information used to generate the correlation information are channel related information generated through channel estimation for the frequency block (which may be referred to simply as "channel related information for the frequency block" below). Hence, the correlation information is information regarding correlation of the channel related information for the frequency block. However, the first exemplary embodiment is not limited to this example.

Entire Frequency Band

In a second modified example of the first exemplary embodiment, for example, the first channel related information and the second channel related information are channel related information generated through channel estimation for the entire frequency band (which may be referred to simply as "channel related information for the entire frequency band" below). Here, the correlation information is information regarding correlation of the channel related information for the entire frequency band.

For example, the frequency band is the frequency band allocated to the terminal apparatus (reception apparatus 100). Alternatively, the frequency band may be a system band.

Hence, for example, it is possible to perform control for a statistic of channel related information on the basis of the correlation for the entire frequency band.

Part of Entire Frequency Band

Alternatively, in the second modified example of the first exemplary embodiment, the first channel related information and the second channel related information may be channel related information generated through channel estimation for part of the frequency band (which may be referred to simply as "channel related information for part of the frequency band" below). In particular, the part of the frequency band may be frequency blocks with high receive power or high reception quality among multiple frequency blocks included in the frequency band. The reception quality may be an SNR or an SINR, or may be another quality.

For example, the frequency band may be the frequency band allocated to the terminal apparatus (reception apparatus 100). Alternatively, the frequency band may be a system band.

FIG. 5 is an explanatory diagram for describing an example of channel estimation for channel related information to be used for generation of correlation information in the second modified example of the first exemplary embodiment. With reference to FIG. 5, blocks #0 to #3 are illustrated as frequency blocks. Blocks #0 to #3 correspond to the frequency band allocated to the reception apparatus 100. Alternatively, blocks #0 to #3 may correspond to a system band. In this example, since receive powers of block #0 and block #3 are each larger than a threshold (Th), channel estimation for block #0 and block #3 are performed to thereby generate channel related information (i.e., channel related information for block #0 and block #3).

Hence, for example, it is possible to perform control for a statistic of channel related information on the basis of the correlation between frequency blocks with high receive power/high reception quality.

The second modified example has been described above. For example, also in the second modified example, channel related information used for generation of the statistic is channel related information for each frequency block, and the statistic is a statistic of channel related information for each frequency block. Hence, the channel related information used for generation of correlation information and the channel related information used for generation of the statistic may be different in target frequency.

(3) Third Modified Example

As described above, the control unit 145 performs control for the statistic of channel related information on the basis of the correlation information. For example, as described above, the control is determination whether to use the statistic. In other words, the control unit 145 determines whether to use the statistic (e.g., for reception processing by the reception apparatus 100 or reporting to the transmission apparatus 200) on the basis of the correlation information. However, the first exemplary embodiment is not limited to this example.

Control

In a third modified example of the first exemplary embodiment, the control may be determination of a parameter to be used for calculation of the statistic. In other words, the control unit 145 may determine a parameter to be used for calculation of the statistic on the basis of the correlation information.

For example, the statistic may be a weighted mean value of channel related information, and the parameter may correspond to weighting factors to be used for calculation of the weighted mean value. In other words, the control unit 145 may determine the weighting factors to be used for calculation of the weighted mean value of channel related information on the basis of the correlation information. As described above, for example, the channel related information is channel estimation values.

First Example

As a first example, the weighted mean value is represented by H(n) as that given below.

$$H(n)=\lambda \cdot h(n)+(1-\lambda)\cdot h(n-1) \quad \text{[Math. 6]}$$

As described above, h(n) represents a channel estimation value for the n-th estimation period, h(n−1) represents a channel estimation value for the n−1-th estimation period, and λ and (1−λ) each represents a weighting factor. The control unit 145 determines λ and (1−λ) on the basis of the correlation value X(n).

As an example, the control unit 145 determines the weighting factor λ so that the weighting factor λ would correspond to the correlation value X(n), as follows.

$$\lambda = 1 - X(n) = 1 - \frac{h(n) \times \overline{h(n-1)}}{|h(n)||h(n-1)|} \quad \text{[Math. 7]}$$

Note that the weighting factor λ may be derived from the correlation value X(n) instead of calculating the weighting factor λ by using the correlation value X(n) itself. For example, the weighting factor λ may be determined by using a function taking the correlation value X(n) as an argument. Alternatively, the weighting factor λ may be determined by using a table indicating the weighting factor λ corresponding to the correlation value X(n).

Second Example

As a second example, the weighted mean value may be represented by H(n) as that given below.

$$H(n)=\lambda \cdot h(n)+(1-\lambda)\cdot H(n-1) \quad \text{[Math. 8]}$$

As described above, h(n) represents a channel estimation value for the n-th estimation period, H(n−1) represents the mean value of channel estimation values for the estimation periods among the n−1-th and earlier estimation periods, and λ and (1−λ) each represents a weighting factor. The control unit 145 determines λ and (1−λ) on the basis of the correlation value X(n).

As an example, as in the first modified example, the correlation value X(n) may be a value indicating the degree of correlation between h(n) and H(n−1), and the control unit 145 may determine the weighting factor λ so that the weighting factor λ would correspond to the correlation value X(n), as follows.

$$\lambda = 1 - X(n) = 1 - \frac{h(n) \times \overline{H(n-1)}}{|h(n)||H(n-1)|} \quad \text{[Math. 9]}$$

Output

As described above, for example, the control unit 145 outputs control information indicating a result of the control, and the control information is input to the output unit 147.

In the third modified example, the control may be determination of a parameter (e.g., weighting factors) to be used for calculation of the statistic (e.g., weighted mean value), and the control information is the parameter, for example.

Note that the output unit 147 calculates the statistic (e.g., weighted mean value) on the basis of the control information (e.g., weighting factors) and outputs the statistic.

The third modified example has been described above. According to the third modified example as above, channel related information more suitable for propagation environment can be used. Specifically, for example, with the determination of a parameter (weighting factors) based on correlation information, it is possible to increase in performance of adapting to channel change when change in propagation environment is fast, and also to increase averaging gain when change in propagation environment is slow.

(4) Fourth Modified Example

As described above, for example, the channel related information is a channel estimation value. However, the first exemplary embodiment is not limited to this example.

First Example: Eigenvalue and Eigenvector

In a fourth modified example of the first exemplary embodiment, as a first example, the channel related information may be an eigenvalue and eigenvector calculated from a channel estimation value.

For example, the correlation information may be information regarding correlation between the first eigenvalue and eigenvector and the second eigenvalue and eigenvector. The first eigenvalue and eigenvector may be an eigenvalue and eigenvector generated through channel estimation for a first estimation period. Moreover, the second eigenvalue and eigenvector may be an eigenvalue and eigenvector generated through channel estimation for one or more estimation periods before the first estimation period.

For example, the statistic may be a statistic (e.g., the mean value) of eigenvalues and eigenvectors.

Note that the eigenvalue and eigenvector (statistic or information itself) output from the output unit 147 may be used for reception processing or reporting to the transmission apparatus 200. The eigenvalue and eigenvector themselves may be reported, or information (e.g., beamforming weight) generated from the eigenvalue and eigenvector may be reported.

Second Example: Beamforming Weights

As a second example, the channel related information may be beamforming weights calculated from a channel estimation value. The beamforming weights may be calculated on the basis of an eigenvalue and eigenvector calculated from the channel estimation value.

For example, the correlation information may be information regarding correlation between first beamforming weights and second beamforming weights. The first beamforming weights may be beamforming weights generated through channel estimation for a first estimation period. Moreover, the second beamforming weights may be beamforming weights generated through channel estimation for one or more estimation periods before the first estimation period.

For example, the statistic may be a statistic (e.g., the mean value) of beamforming weights.

Note that the beamforming weights (statistic or information itself) output from the output unit 147 may be used for reception processing or reporting to the transmission apparatus 200.

(5) Fifth Modified Example

In a fifth modified example of the first exemplary embodiment, additional operation of the reception apparatus 100 may be added.

FIG. 6 is a block diagram illustrating an example of a schematic configuration of the channel related information output unit 140 according to the fifth modified example of the first exemplary embodiment. According to FIG. 6, in the fifth modified example, the channel related information output unit 140 further includes a cycle determination unit 149. The example in FIG. 6 is the same as or similar to the example in FIG. 3 regarding other respects.

For example, the cycle determination unit 149 determines the cycle for calculating an eigenvalue and eigenvector or beamforming weights from a channel estimation value (which may be referred to as a "calculation cycle" below) on the basis of control information indicating a result of the control. The control unit 145 outputs the control information, and the control information is input to the cycle determination unit 149. The calculation cycle is also considered as a cycle for updating the eigenvalue and eigenvector or the beamforming weights on the basis of a channel estimation value (i.e., update cycle).

First Example

As described above, for example, the control is determination whether to use a statistic of channel related information. In this case, for example, the control information is information indicating a result of the determination (e.g., whether to use the statistic of channel related information). The cycle determination unit 149 counts the number of times the statistic of channel related information is used in a predetermined time period, on the basis of the control information, and determines the calculation cycle on the basis of the number of times.

For example, the cycle determination unit 149 determines the calculation cycle so that the calculation cycle would be a longer cycle when the number of times is larger (i.e., when change in propagation environment is slow), and determines the calculation cycle so that the calculation cycle would be shorter when the number of times is smaller (i.e., when change in propagation environment is fast).

More specifically, for example, the cycle determination unit 149 calculates and determines the calculation cycle by using a function taking the number of times as an argument. Alternatively, the cycle determination unit 149 may determine the calculation cycle by using a table indicating a cycle corresponding to the number of times.

Note that the cycle determination unit 149 may determine the cycle on the basis of the rate at which the statistic is used instead of the number of times the statistic is used. The rate being large corresponds to the number of times being large, and the rate being small corresponds to the number of times being small.

Second Example

As described as the third modified example, the control may be determination of a parameter to be used for calculation of the statistic. In this case, the control information may be the parameter. The cycle determination unit 149 may determine the calculation cycle on the basis of the parameter. As described above, the parameter may be weighting factors to be used for calculation of the weighted mean value.

For example, the cycle determination unit 149 may determine the calculation cycle so that the calculation cycle would be a longer cycle when the weighting factor ($\lambda$) is smaller (i.e., when change in propagation environment is slow), and determine the calculation cycle so that the calculation cycle would be a shorter cycle when the weighting factor ($\lambda$) is larger (i.e., when change in propagation environment is fast).

More specifically, for example, the cycle determination unit 149 may calculate and determine the calculation cycle by using a function taking the parameter (e.g., weighting factors) as an argument. Alternatively, the cycle determination unit 149 may determine the calculation cycle by using a table indicating a cycle corresponding to the parameter (e.g., weighting factors).

Others

The cycle determination unit 149 may determine the calculation cycle on the basis of the correlation information instead of the control information. In this case, the second information acquisition unit 142 may output the correlation information, and the correlation information may be input to the cycle determination unit 149.

For example, the cycle determination unit 149 may determine the calculation cycle so that the calculation cycle would be a longer cycle when the correlation value ($X(n)$) is larger (i.e., when change in propagation environment is slow), and determine the calculation cycle so that the calculation cycle would be a shorter cycle when the correlation value ($X(n)$) is smaller (i.e., when change in propagation environment is fast).

More specifically, for example, the cycle determination unit 149 may calculate and determine the calculation cycle by using a function taking the correlation value as an argument. Alternatively, the cycle determination unit 149 may determine the calculation cycle by using a table indicating a cycle corresponding to the correlation value.

Output

The cycle determination unit 149 outputs cycle information indicating the calculation cycle. The reception apparatus 100 then calculates an eigenvalue and eigenvector or beamforming weights from a channel estimation value at the calculation cycle on the basis of the cycle information.

Additional Operation

For example, the reception apparatus 100 may calculate an eigenvalue and eigenvector and/or beamforming weights with a frequency resolution depending to the calculation cycle. Moreover, for this purpose, the reception apparatus 100 may calculate a channel estimation value with the frequency resolution.

For example, the reception apparatus 100 may calculate an eigenvalue and eigenvector and/or beamforming weights with a higher frequency resolution (i.e., of a narrower frequency block) when the calculation cycle is longer (i.e., when the calculation load is small). The reception apparatus 100 may calculate an eigenvalue and eigenvector and/or beamforming weights with a lower frequency resolution (i.e., of a wider frequency block) when the calculation cycle is shorter (i.e., when the calculation load is large).

This enables calculation making use of the processing ability of the reception apparatus 100.

The fifth modified example has been described above. According to the fifth modified example, the reception apparatus 100 can calculate an eigenvalue/eigenvector or beamforming weights at a cycle depending to propagation environment and perform update.

(6) Sixth Modified Example

As described above, the control unit 145 performs control for a statistic of channel related information on the basis of the correlation information. Moreover, as described above, for example, the statistic is the mean value of channel related information. However, the first exemplary embodiment is not limited to this example.

In a sixth modified example of the first exemplary embodiment, the statistic may be a value of another kind, such as a median or a most frequent value (a mode).

(7) Seventh Modified Example

As described above, for example, the reception apparatus 100 is a terminal apparatus, and the transmission apparatus 200 is a base station. Moreover, channel estimation performed by the reception apparatus 100 (channel related information generation unit 110) is channel estimation for a channel from the base station (transmission apparatus 200) to the terminal apparatus (reception apparatus 100). In other words, the channel estimation is downlink channel estimation. However, the first exemplary embodiment is not limited to this example.

In the sixth modified example of the first exemplary embodiment, the reception apparatus 100 may be a base station, and the transmission apparatus 200 may be a terminal apparatus. Moreover, channel estimation performed by the reception apparatus 100 (channel related information generation unit 110) may be channel estimation for the channel from the terminal apparatus (transmission apparatus 200) to the base station (reception apparatus 100). In other words, the channel estimation may be uplink channel estimation.

Note that the base station (reception apparatus 100) is a node configured to perform wireless communication with terminal apparatuses located within the coverage area and is a node in a radio access network (RAN) in other words. For example, the base station may be an evolved NodeB (eNB) or may be a generation NodeB (gNB) in 5G. The base station may include multiple units (or multiple nodes). The multiple units (or multiple nodes) may include a first unit (or first node) configured to perform higher protocol layer processing and a second unit (or second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). Terms used to refer to the first unit (or first node) and the second unit (or second node) are, of course, not limited to these examples. Alternatively, the base station may be a single unit (or single node). In this case, the base station may be one of the multiple units (e.g., one of the first unit and the second unit) and may be connected to another one of the multiple units (e.g., the other one of the first unit and the second unit).

The first to seventh modified examples of the first exemplary embodiment have been described above. However, these modified examples may, of course, be combined.

The first exemplary embodiment has been described above. According to the first exemplary embodiment, channel related information more suitable for propagation environment can be used, for example.

3. Second Exemplary Embodiment

Figure 7:
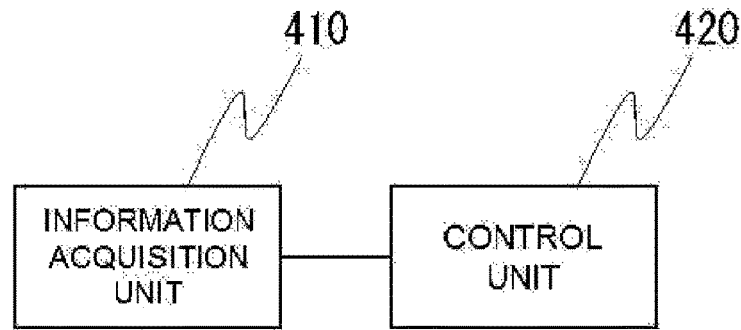
FIG. 7 is a block diagram illustrating an example of a schematic configuration of a wireless communication apparatus according to a second exemplary embodiment.
Figure 8:
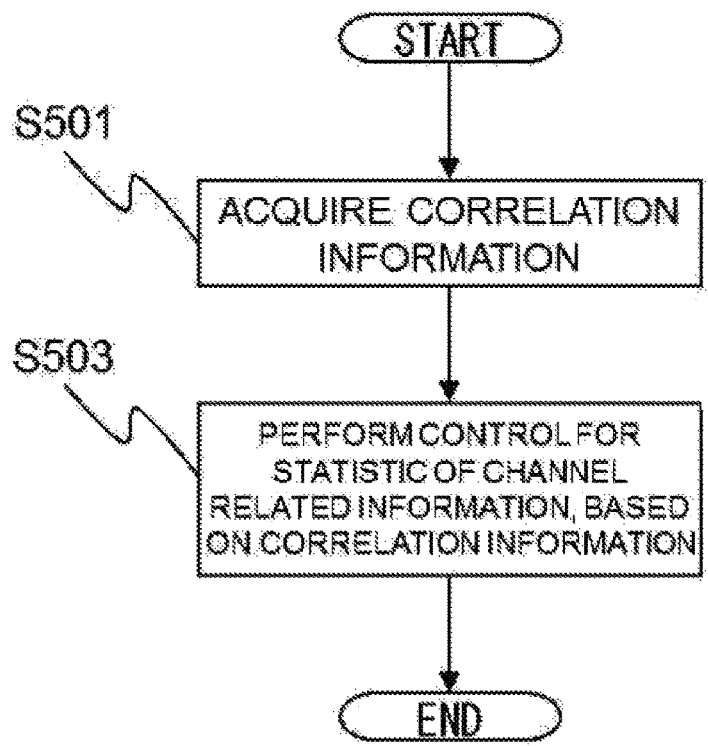
FIG. 8 is a flowchart for describing an example of a schematic flow of processing of the wireless communication apparatus according to the second exemplary embodiment.

Next, with reference to FIG. 7 and FIG. 8, a second exemplary embodiment of the present invention is described. The above-described first exemplary embodiment is a concrete exemplary embodiment, and the second exemplary embodiment is a more generalized exemplary embodiment.

3.1. Configuration of Wireless Communication Apparatus

First, with reference to FIG. 7, an example of a configuration of a wireless communication apparatus 400 according to the second exemplary embodiment is described. FIG. 7 is a block diagram illustrating an example of a schematic configuration of the wireless communication apparatus 400 according to the second exemplary embodiment. According to FIG. 7, the wireless communication apparatus 400 includes an information acquisition unit 410 and a control unit 420.

The information acquisition unit 410 and the control unit 420 may be implemented by one or more processors, such as a baseband (BB) processor and/or a processor of another kind, and a memory storing programs (instructions). Note that the memory may be located outside the one or more processors or may be included in the one or more processors.

The wireless communication apparatus 400 may include a memory storing programs (instructions) and one or more processors that can execute the programs (instructions). The one or more processors may execute the programs to perform operations of the information acquisition unit 410 and the control unit 420. The programs may be programs for causing the one or more processors to perform operations of the information acquisition unit 410 and the control unit 420.

Note that the wireless communication apparatus 400 may, of course, include constituent elements other than the information acquisition unit 410 and the control unit 420.

The information acquisition unit 410 acquires correlation information regarding correlation between first channel related information generated through channel estimation for a first estimation period and second channel related information generated through channel estimation for one or more estimation periods before the first estimation period.

The control unit 420 performs control for a statistic of channel related information on the basis of the correlation information.

Descriptions of the correlation information, the statistic, and the control (as well as descriptions of an estimation period, channel estimation, channel related information, and the like) are, for example, the same as or similar to the descriptions of those in the first exemplary embodiment. Hence, overlapping descriptions are omitted here.

As an example, the information acquisition unit 410 may operate similarly to the second information acquisition unit 142 according to the first exemplary embodiment, and the control unit 420 may operate similarly to the control unit 145 according to the first exemplary embodiment.

As an example, the wireless communication apparatus 400 according to the second exemplary embodiment may be the reception apparatus 100 according to the first exemplary embodiment. Alternatively, the wireless communication apparatus 400 according to the second exemplary embodiment may be an apparatus, a unit, or a module included in the reception apparatus 100 according to the first exemplary embodiment.

The second exemplary embodiment is, of course, not limited to these examples.

3.2. Flow of Processing

Next, with reference to FIG. 8, an example of processing of the wireless communication apparatus 400 according to the second exemplary embodiment is described. FIG. 8 is a flowchart for describing an example of a schematic flow of processing of the wireless communication apparatus 400 according to the second exemplary embodiment.

The information acquisition unit 410 acquires correlation information regarding correlation between first channel related information generated through channel estimation for a first estimation period and second channel related information generated through channel estimation for one or more estimation periods before the first estimation period (S501).

The control unit 420 performs control for a statistic of channel related information on the basis of the correlation information (S503). Thereafter, the processing is terminated.

The second exemplary embodiment has been described above. According to the second exemplary embodiment, channel related information more suitable for propagation environment can be used, for example. Note that each of the modified examples (first to seventh modified examples) of the first exemplary embodiment is applicable also to the second exemplary embodiment.

In the above-described technique in Patent Literature 1 (PTL1), it is difficult to use a channel estimation value suitable for propagation environment in reception processing. Specifically, it is desirable to increase in performance of adapting to channel change by using a larger weighting factor (forgetting factor) used for weighted moving averaging, when propagation environment changes fast, while it is desired to increase the averaging gain by using a smaller weighting factor when propagation environment changes slowly. Although a suitable weighting factor is different for each propagation environment as described above, the above-described technique does not adjust the weighting factor according to propagation environment. Hence, in this technique, it is difficult to use a channel estimation value suitable for propagation environment.

Moreover, it is difficult, also in the above-described technique in Patent Literature 2 (PTL2), to use a channel estimation value suitable for propagation environment in reception processing. Specifically, in this technique, for example, although the error between the mean value of channel estimation values and an actual channel variation value is large when SIR/SINR is sufficiently large but signal power varies due to fading, the mean value of channel estimation values is used in reception processing. Hence, in this technique, it is difficult to use a channel estimation value suitable for propagation environment including fading.

According to the present invention, for example, channel related information more suitable for propagation environment can be used. Note that the present invention may exert other advantages instead of the above example advantage or together with the above example advantage.

The exemplary embodiments of the present invention have been described above. However, the present invention is not limited to these exemplary embodiments. It should be understood by those skilled in the art that these exemplary embodiments are merely provided as examples and that various modifications can be made without departing from the scope and spirit of the present invention.

For example, the steps in any processing described herein need not be performed chronologically in the order illustrated in the corresponding flowchart. For example, the steps of the processing may be performed in an order different from the order illustrated as the corresponding flowchart or may be performed in parallel. Moreover, one or some of the steps of the processing may be deleted, or one or more steps may be added to the processing.

Moreover, an apparatus, a unit, or a module including constituent elements of the reception apparatus or the wireless communication apparatus described herein (e.g., the information acquisition unit and/or the control unit) may be provided. In addition, a method including processing of the constituent elements may be provided, and a program or program product for causing a processor to execute processing of the constituent elements may be provided. Furthermore, non-transitory computer readable recording medium recording the program may be provided. It is apparent that such an apparatus, a module, a method, a program, a program product, and a non-transitory computer readable recording medium are also included in the present invention.

Some of or all the above-described exemplary embodiments can be described as in the following Supplementary Notes, but are not limited to the following.

(Supplementary Note 1)

A wireless communication apparatus comprising:

an information acquisition unit configured to acquire correlation information regarding correlation between first channel related information generated through channel estimation for a first estimation period and second channel related information generated through channel estimation for one or more estimation periods before the first estimation period; and a control unit configured to perform control for a statistic of channel related information, based on the correlation information.

(Supplementary Note 2)

The wireless communication apparatus according to Supplementary Note 1, wherein the statistic is a mean value of channel related information.

(Supplementary Note 3)

The wireless communication apparatus according to Supplementary Note 2, wherein the mean value is a mean value of channel related information generated through channel estimation for the first estimation period and channel related information generated through channel estimation for a second estimation period immediately before the first estimation period.

(Supplementary Note 4)

The wireless communication apparatus according to Supplementary Note 2, wherein the mean value is a mean value of channel related information generated through channel estimation for the first estimation period and an earlier mean value of channel related information generated through channel estimation for multiple estimation periods before the first estimation period.

(Supplementary Note 5)

The wireless communication apparatus according to any one of Supplementary Notes 1 to 4, wherein the control is determination whether to use the statistic.

(Supplementary Note 6)

The wireless communication apparatus according to Supplementary Note 5, wherein the control is determination whether to use the statistic or to use channel related information generated through channel estimation for the first estimation period.

(Supplementary Note 7)
The wireless communication apparatus according to Supplementary Note 5 or 6, wherein
the correlation information is information indicating degree of correlation between the first channel related information and the second channel related information, and
the control unit is configured to determine to use the statistic in a case that the degree of correlation indicated by the correlation information is higher than predetermined degree of correlation.

(Supplementary Note 8)
The wireless communication apparatus according to Supplementary Note 7, wherein the control unit is configured to determine to use channel related information generated through channel estimation for the first estimation period in a case that the degree of correlation indicated by the correlation information is lower than the predetermined degree of correlation.

(Supplementary Note 9)
The wireless communication apparatus according to any one of Supplementary Notes 1 to 4, wherein the control is determination of a parameter to be used for calculation of the statistic.

(Supplementary Note 10)
The wireless communication apparatus according to Supplementary Note 9, wherein
the statistic is a weighted mean value of channel related information, and
the parameter is weighting factors to be used for calculation of weighted mean value.

(Supplementary Note 11)
The wireless communication apparatus according to any one of Supplementary Notes 1 to 10, wherein the second channel related information is channel related information generated through channel estimation for a second estimation period immediately before the first estimation period.

(Supplementary Note 12)
The wireless communication apparatus according to any one of Supplementary Notes 1 to 10, wherein the second channel related information is a statistic of channel related information generated through channel estimation for multiple estimation periods before the first estimation period.

(Supplementary Note 13)
The wireless communication apparatus according to any one of Supplementary Notes 1 to 12, wherein the first channel related information and the second channel related information are channel related information generated through channel estimation for an entire frequency band.

(Supplementary Note 14)
The wireless communication apparatus according to any one of Supplementary Notes 1 to 12, wherein the first channel related information and the second channel related information are channel related information generated through channel estimation for part of a frequency band.

(Supplementary Note 15)
The wireless communication apparatus according to Supplementary Note 14, wherein the part of the frequency band is a frequency block with high receive power or high reception quality among multiple frequency blocks included in the frequency band.

(Supplementary Note 16)
The wireless communication apparatus according to any one of Supplementary Notes 13 to 15, wherein the frequency band is a frequency band allocated to a terminal apparatus.

(Supplementary Note 17)
The wireless communication apparatus according to any one of Supplementary Notes 13 to 15, wherein the frequency band is a system band.

(Supplementary Note 18)
The wireless communication apparatus according to any one of Supplementary Notes 1 to 17, wherein the first channel related information, the second channel related information, and the channel related information are channel estimation values.

(Supplementary Note 19)
The wireless communication apparatus according to any one of Supplementary Notes 1 to 17, wherein the first channel related information, the second channel related information, and the channel related information are each an eigenvalue and eigenvector calculated from a channel estimation value.

(Supplementary Note 20)
The wireless communication apparatus according to any one of Supplementary Notes 1 to 17, wherein the first channel related information, the second channel related information, and the channel related information are each beamforming weights calculated from a channel estimation value.

(Supplementary Note 21)
The wireless communication apparatus according to any one of Supplementary Notes 1 to 20, further comprising:
a cycle determination unit configured to determine a cycle for calculating an eigenvalue and eigenvector or beamforming weights from a channel estimation value, based on control information indicating a result of the control or the correlation information.

(Supplementary Note 22)
The wireless communication apparatus according to Supplementary Note 21, wherein
the control is determination whether to use the statistic, and
the cycle determination unit is configured to determine the cycle, based on the number of times or rate at which a statistic of channel related information is used.

(Supplementary Note 23)
The wireless communication apparatus according to Supplementary Note 21, wherein
the control is determination of a parameter to be used for calculation of the statistic, and
the control information is the parameter.

(Supplementary Note 24)
The wireless communication apparatus according to any one of Supplementary Notes 1 to 23, wherein the statistic is information for reception processing by the wireless communication apparatus.

(Supplementary Note 25)
The wireless communication apparatus according to any one of Supplementary Notes 1 to 24, wherein the statistic is information for reporting from the wireless communication apparatus to another wireless communication apparatus.

(Supplementary Note 26)
The wireless communication apparatus according to any one of Supplementary Notes 1 to 25, wherein
the wireless communication apparatus is a terminal apparatus, and
the channel estimation is downlink channel estimation.

(Supplementary Note 27)
The wireless communication apparatus according to any one of Supplementary Notes 1 to 25, wherein
the wireless communication apparatus is a base station, and
the channel estimation is uplink channel estimation.

(Supplementary Note 28)
A method comprising:
acquiring correlation information regarding correlation between first channel related information generated through channel estimation for a first estimation period and second channel related information generated through channel estimation for one or more estimation periods before the first estimation period; and
performing control for a statistic of channel related information, based on the correlation information.

(Supplementary Note 29)
A program product causing a processor to execute:
acquiring correlation information regarding correlation between first channel related information generated through channel estimation for a first estimation period and second channel related information generated through channel estimation for one or more estimation periods before the first estimation period; and
performing control for a statistic of channel related information, based on the correlation information.

(Supplementary Note 30)
A non-transitory computer readable recording medium recording a program for causing a processor to execute:
acquiring correlation information regarding correlation between first channel related information generated through channel estimation for a first estimation period and second channel related information generated through channel estimation for one or more estimation periods before the first estimation period; and
performing control for a statistic of channel related information, based on the correlation information.

In a mobile communication system, it is possible to use channel related information more suitable for propagation environment.

What is claimed is:

1. A wireless communication apparatus comprising:
a memory storing instructions; and
one or more processors configured to execute the instructions to:
acquire correlation information regarding correlation between first channel related information generated through channel estimation for a first estimation period and second channel related information generated through channel estimation for one or more estimation periods before the first estimation period; and
perform control for a statistic of channel related information, based on the correlation information,
wherein the first channel related information, the second channel related information, and the channel related information are channel estimation values.

2. The wireless communication apparatus according to claim 1, wherein the statistic is a mean value of channel related information.

3. The wireless communication apparatus according to claim 2, wherein the mean value is a mean value of channel related information generated through channel estimation for the first estimation period and channel related information generated through channel estimation for a second estimation period immediately before the first estimation period.

4. The wireless communication apparatus according to claim 2, wherein the mean value is a mean value of channel related information generated through channel estimation for the first estimation period and an earlier mean value of channel related information generated through channel estimation for multiple estimation periods before the first estimation period.

5. The wireless communication apparatus according to claim 1, wherein the control is determination whether to use the statistic.

6. The wireless communication apparatus according to claim 5, wherein the control is determination whether to use the statistic or to use channel related information generated through channel estimation for the first estimation period.

7. The wireless communication apparatus according to claim 5 wherein
the correlation information is information indicating degree of correlation between the first channel related information and the second channel related information, and
the one or more processors are configured to execute the instructions to determine to use the statistic in a case that the degree of correlation indicated by the correlation information is higher than predetermined degree of correlation.

8. The wireless communication apparatus according to claim 7, wherein the one or more processors are configured to execute the instructions to determine to use channel related information generated through channel estimation for the first estimation period in a case that the degree of correlation indicated by the correlation information is lower than the predetermined degree of correlation.

9. The wireless communication apparatus according to claim 1, wherein the control is determination of a parameter to be used for calculation of the statistic.

10. The wireless communication apparatus according to claim 9, wherein
the statistic is a weighted mean value of channel related information, and
the parameter is weighting factors to be used for calculation of weighted mean value.

11. The wireless communication apparatus according to claim 1, wherein the second channel related information is channel related information generated through channel estimation for a second estimation period immediately before the first estimation period.

12. The wireless communication apparatus according to claim 1, wherein the second channel related information is a statistic of channel related information generated through channel estimation for multiple estimation periods before the first estimation period.

13. The wireless communication apparatus according to claim 1, wherein the first channel related information and the second channel related information are channel related information generated through channel estimation for an entire frequency band.

14. The wireless communication apparatus according to claim 1, wherein the first channel related information and the second channel related information are channel related information generated through channel estimation for part of a frequency band.

15. The wireless communication apparatus according to claim 13, wherein the frequency band is a frequency band allocated to a terminal apparatus.

16. The wireless communication apparatus according to claim 13, wherein the frequency band is a system band.

17. The wireless communication apparatus according to claim 1, wherein the one or more processors are configured to execute the instructions to determine a cycle for calculating an eigenvalue and eigenvector or beamforming weights from a channel estimation value, based on control information indicating a result of the control or the correlation information.

18. A method comprising:
    acquiring correlation information regarding correlation between first channel related information generated through channel estimation for a first estimation period and second channel related information generated through channel estimation for one or more estimation periods before the first estimation period; and
    performing control for a statistic of channel related information, based on the correlation information,
    wherein the first channel related information, the second channel related information, and the channel related information are channel estimation values.

19. A non-transitory computer readable recording medium recording a program for causing a processor to execute:
    acquiring correlation information regarding correlation between first channel related information generated through channel estimation for a first estimation period and second channel related information generated through channel estimation for one or more estimation periods before the first estimation period; and
    performing control for a statistic of channel related information, based on the correlation information,
    wherein the first channel related information, the second channel related information, and the channel related information are channel estimation values.

* * * * *